(12) United States Patent
Vey

(10) Patent No.: US 8,356,839 B1
(45) Date of Patent: Jan. 22, 2013

(54) TRAILER FRAME

(76) Inventor: Jeffrey L. Vey, Troup, TX (US)

( * ) Notice: Subject to any disclaimer, the term of this patent is extended or adjusted under 35 U.S.C. 154(b) by 0 days.

(21) Appl. No.: 12/868,839

(22) Filed: Aug. 26, 2010

Related U.S. Application Data

(60) Provisional application No. 61/241,632, filed on Sep. 11, 2009.

(51) Int. Cl.
*B62D 7/22* (2006.01)
(52) U.S. Cl. .......... 280/788; 280/124.109; 280/124.128; 280/204; 280/285
(58) Field of Classification Search ........... 280/124.109, 280/124.128, 204, 285, 286, 86.751
See application file for complete search history.

(56) References Cited

U.S. PATENT DOCUMENTS

| | | | | |
|---|---|---|---|---|
| 3,666,288 A * | 5/1972 | Carton et al. | ................. | 280/683 |
| 3,761,109 A * | 9/1973 | Campbell | .............. | 280/124.128 |
| 3,858,902 A * | 1/1975 | Howells et al. | ............ | 280/6.159 |
| 5,810,544 A * | 9/1998 | Wellman | ....................... | 414/495 |
| 7,073,816 B1 * | 7/2006 | Larson et al. | ................. | 280/656 |
| 7,121,575 B2 | 10/2006 | Finch | | |
| 7,162,854 B2 * | 1/2007 | Yeomans et al. | ............... | 56/14.9 |
| 7,306,247 B2 * | 12/2007 | Wu | ........................ | 280/124.128 |

\* cited by examiner

*Primary Examiner* — Toan To
(74) *Attorney, Agent, or Firm* — Jones, Walker, Waechter, Poitevent, Carrere & Denegre, LLP

(57) ABSTRACT

A trailer having a forward frame section, a rearward frame section, and two trailing arm suspension links forming an independent suspension system without a unitary cross axle. The trailing arm suspension links further include (i) a pivot joint connected to the forward frame section, (ii) a wheel hub assembly including a spindle; and (iii) a shock mount including a bracket position rearward of the spindle. The shock absorbing mechanism has a first end pivotally connected to the shock mount and a second end pivotally connected to the rear frame section rearward of the shock mount.

22 Claims, 6 Drawing Sheets

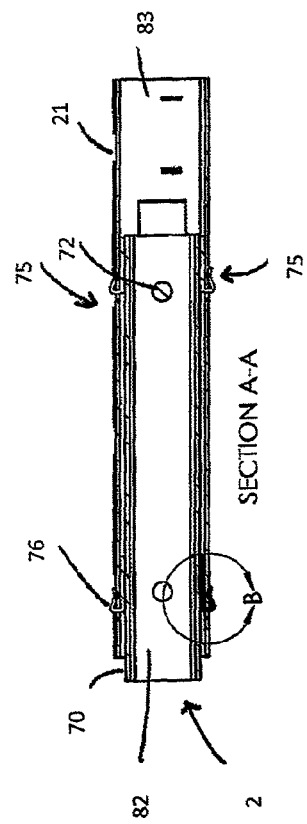
Figure 5B
SECTION A-A
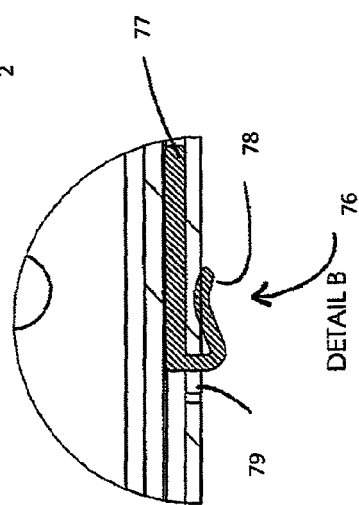
DETAIL B
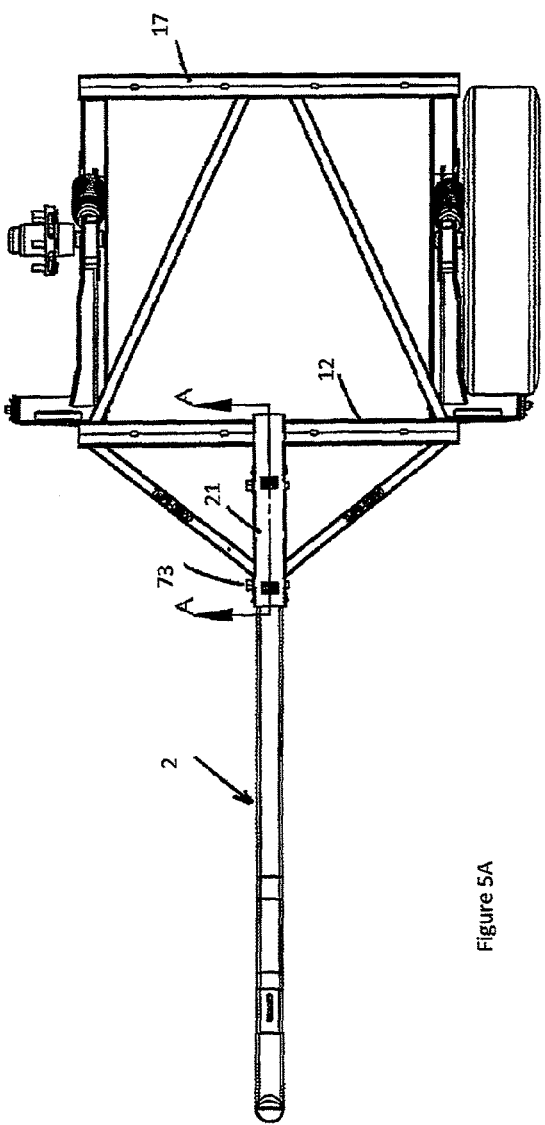
Figure 5A

TRAILER FRAME

This application claims the benefit under 37 USC §119(e) to U.S. provisional application Ser. No. 61/241,632, filed Sep. 11, 2009, which is incorporated by reference herein in its entirety.

FIELD OF INVENTION

The present invention relates to frames and suspension systems for vehicles and in preferred embodiments, for independent suspension trailers.

BACKGROUND OF INVENTION

There exist many types of vehicle suspension systems, including independent suspension systems for each wheel of the vehicle and common traverse axle suspension system supporting wheels on each side of the vehicle. Both types of suspension systems have been employed on trailers, including trailers designed to be towed behind motorcycles, see for example U.S. Pat. No. 7,121,575.

BRIEF DESCRIPTION OF THE DRAWINGS

FIG. 5A is a top view of the trailer frame seen in FIG. 1.

FIG. 5B is a cross-section of the trailer tongue/insert structure.

DETAILED DESCRIPTION OF SELECTED EMBODIMENTS

Figure 1:
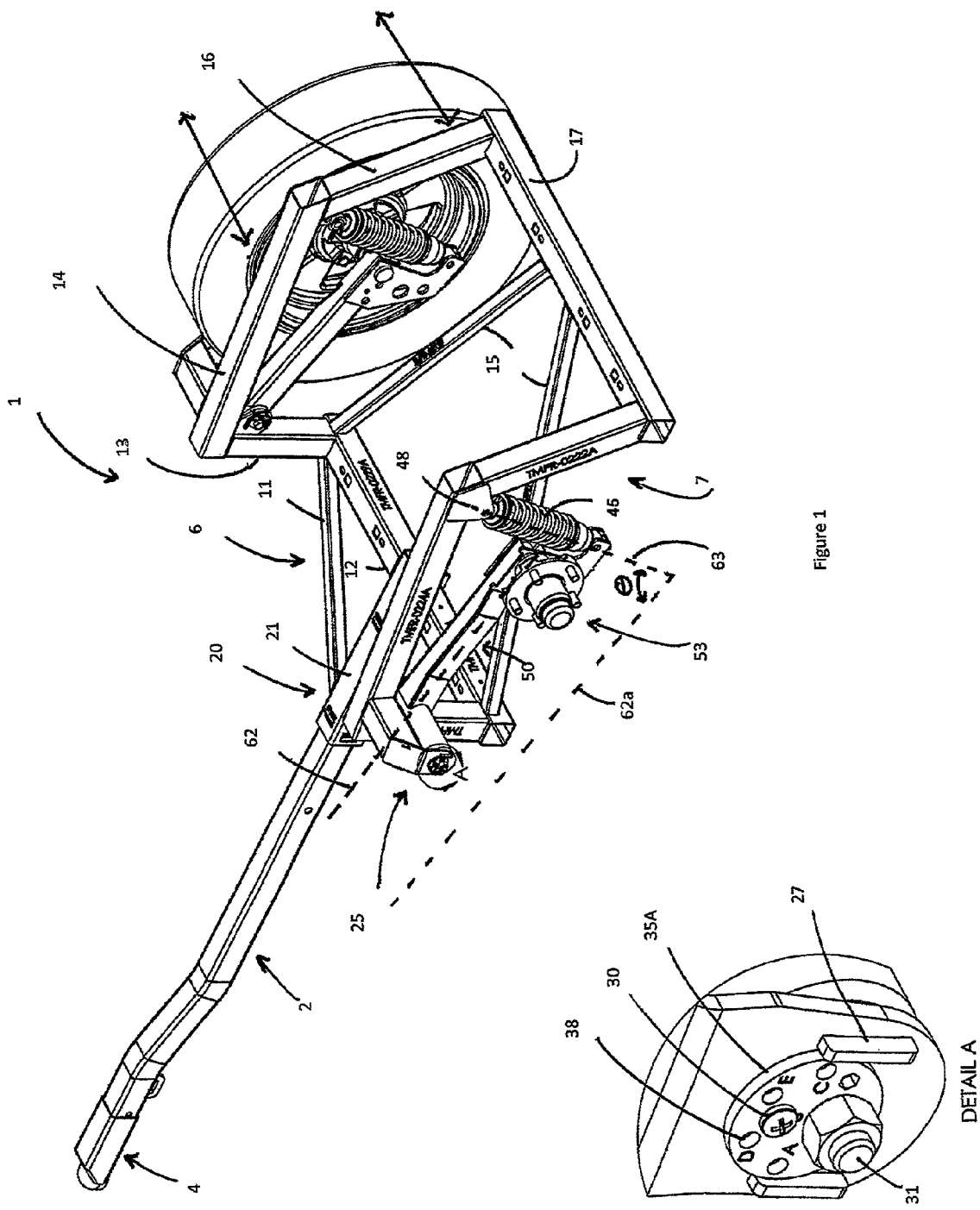
FIG. 1 is a perspective view of one embodiment of the trailer frame of the present invention.

FIG. 1 illustrates one embodiment of the present invention, trailer frame 1. Trailer frame 1 will generally comprise hitch assembly 4 connected to tongue 2 which is in turn connected to tongue receiver slot or receiver assembly 20. Tongue receiver assembly 20 is attached to the forward frame section 6. A trailing arm suspension link 50 is connected between forward frame section 6 and rearward frame section 7, and a wheel hub assembly 53 is connected to suspension link 50 and supports a convention wheel/tire combination.

In the embodiment of FIG. 1, the forward frame section 6 comprises two front angled members 11 connected to tongue receiver assembly 20 and front lateral member 12, front vertical members 13, and at least the forward portions of upper longitudinal members 14 and rear angular members 15. The rearward frame section 7 includes the rear lateral member 17, rear vertical members 16, and the rear most portions of upper longitudinal members 14 and rear angular members 15. In one embodiment, forward frame section 6 generally comprises the frame structure forward of wheel hub assembly 53 and rearward frame section 7 generally comprises the frame structure to the rear of wheel hub assembly 53. However, the invention is not limited to a particular frame configuration and any frame design supporting the functions described herein should be considered within the scope of the present invention.

In one embodiment, hitch assembly 4 is a convention ball type receiver for gripping a conventional ball-type hitch on the towing vehicle. However, hitch assembly 4 could be any type of structure designed to mate with any conventional or future developed towing mechanism.

Figure 2:
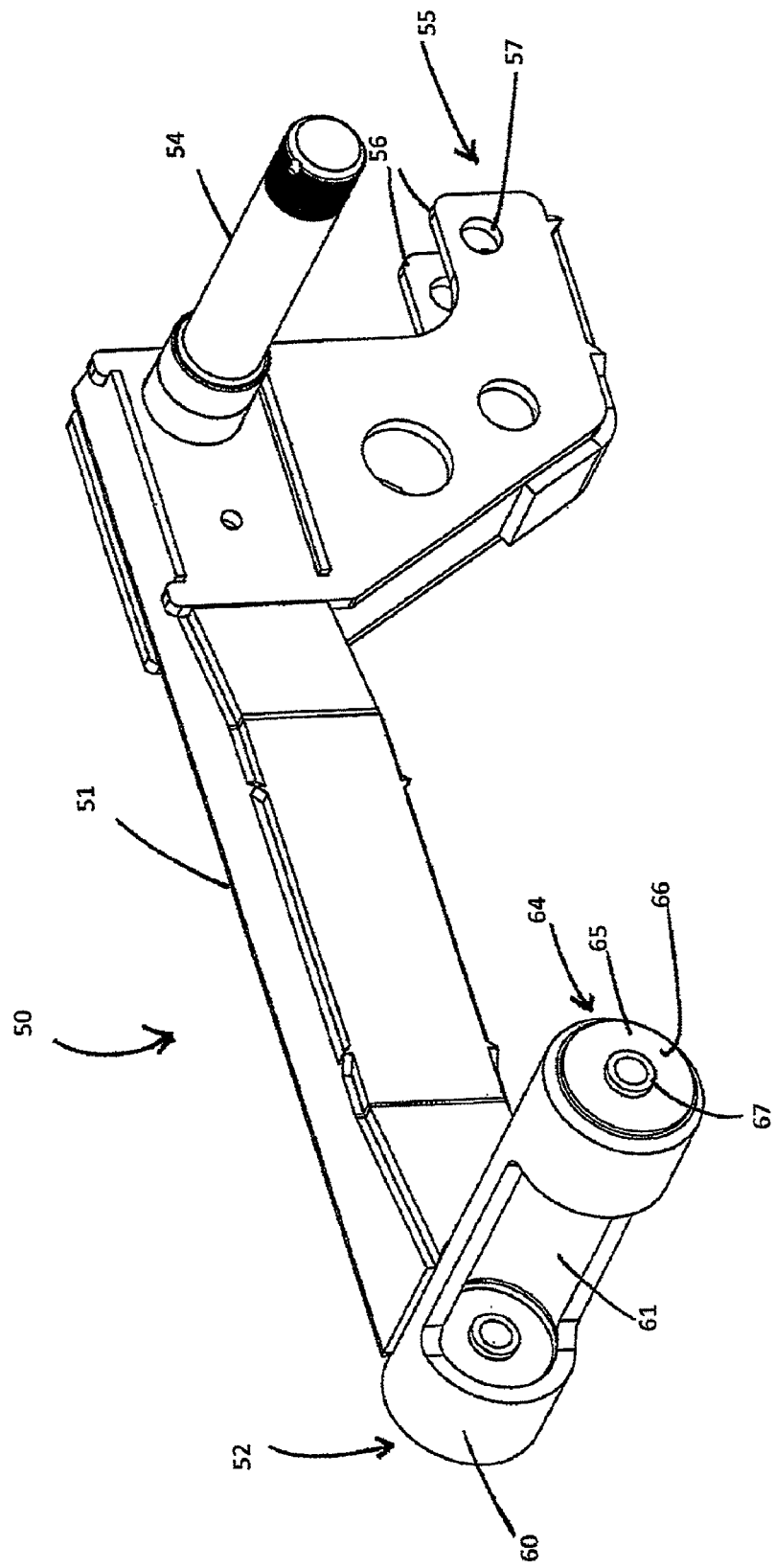
FIG. 2 is a perspective view of one embodiment of a trailing arm suspension link.

In the embodiment of the figures, trailing arm suspension link 50 is connected to forward frame section 6 by pivot joint 52 as seen in FIG. 2. The embodiment of suspension link 50 seen in FIG. 2 generally comprises arm section 51 with pivot joint 52 on one end and spindle 54 (which supports wheel hub assembly 53 in FIG. 1) on the opposing end. The shock mount 55 is positioned below spindle 54 and in the particular embodiment of FIG. 2, is an L-shaped double bracket 56 with pin apertures 57 on which a shock absorbing mechanism will be pivotally mounted. The embodiment of the pivot joint 52 seen in FIG. 2 is formed of a pivot joint cylinder 60 welded to arm section 51. The illustrated version of pivot joint cylinder 60 will have a open face section formed on a forward surface which accommodates spacer bushing 68 (see FIG. 3) and will further have bushings 64 fitted in the open ends. In a preferred embodiment, bushings 64 are noise, vibration, and harshness (NVH) bushings 65 having cylindrical rubber-like outer bushing cylinder 66 with a metal tubular center sleeve 67. In one preferred embodiment, the NVH bushings are sold by Federal-Mogul Corporation of Southfield, Mich. under product no. AXCBR251. Pivot joint cylinder 60, arm section 51, spindle 54, and shock mount 55 will typically be constructed of steel, but could alternatively be constructed of aluminum or other suitable materials. Although FIG. 2 shows an arm section 51 constructed of folded and welded plate sections, arm section 51 could take virtually any configuration that provides a functional connection between pivot joint 52 and spindle 54/shock mount 55. Likewise, pivot joint 52 could be any pivoting connection which provides a stable, durable connecting point for trailing arm suspension link 50 to front frame 6.

FIG. 1 illustrates how this embodiment of the suspension system will have a shock absorbing mechanism 45 with a first end pinned (i.e., pivotally connected) to shock mount 55 and a second end pinned to bracket 48 at approximately the junction of upper longitudinal member 14 and rear vertical member 16. In the illustrated embodiment, the connection is made with a conventional nut and bolt, but could be made with any suitable pivoting connection. It can be seen in this example that shock absorbing mechanism 45 is mounted in a preponderantly vertical orientation (i.e., the shock absorbing mechanism is oriented more toward the perpendicular with the ground surface than toward the parallel with the ground surface). However, other embodiments need not necessarily have this preponderantly vertical orientation.

FIG. 1 also illustrates how an angle theta is formed between the axis 63 extending through shock absorbing mechanism 45 and axis 62 extending through trailing arm suspension link 50 (theta being shown relative to reference line 62a which is parallel to axis 62). In the embodiment of FIG. 1, theta is about 90° when shock absorbing mechanism 45 is in the neutral state (i.e., with trailer 1 at rest on a ground surface and having no external load). However, in alternate embodiments, the value of theta could vary between about 60° and about 120° (with shock absorbing mechanism 45 in the neutral state) and even outside this about 60° to 120° range in less preferred embodiments. Moreover, in other embodiments, shock absorbing mechanism 45 could be mounted at different orientations and at different locations on rearward frame section 7. In one preferred embodiment, shock absorbing mechanism 45 is a coil over shock device such as sold by Progressive Suspension, Inc. of La Palma, Calif. 90623 under part no.

612-1202-003, but shock absorbing mechanism 45 could alternatively be a metal spring shock device, a piston shock device, an air spring shock device, or other conventional or future developed shock absorbing mechanism which may perform a reasonably similar function in the currently described suspension system.

Figure 3:
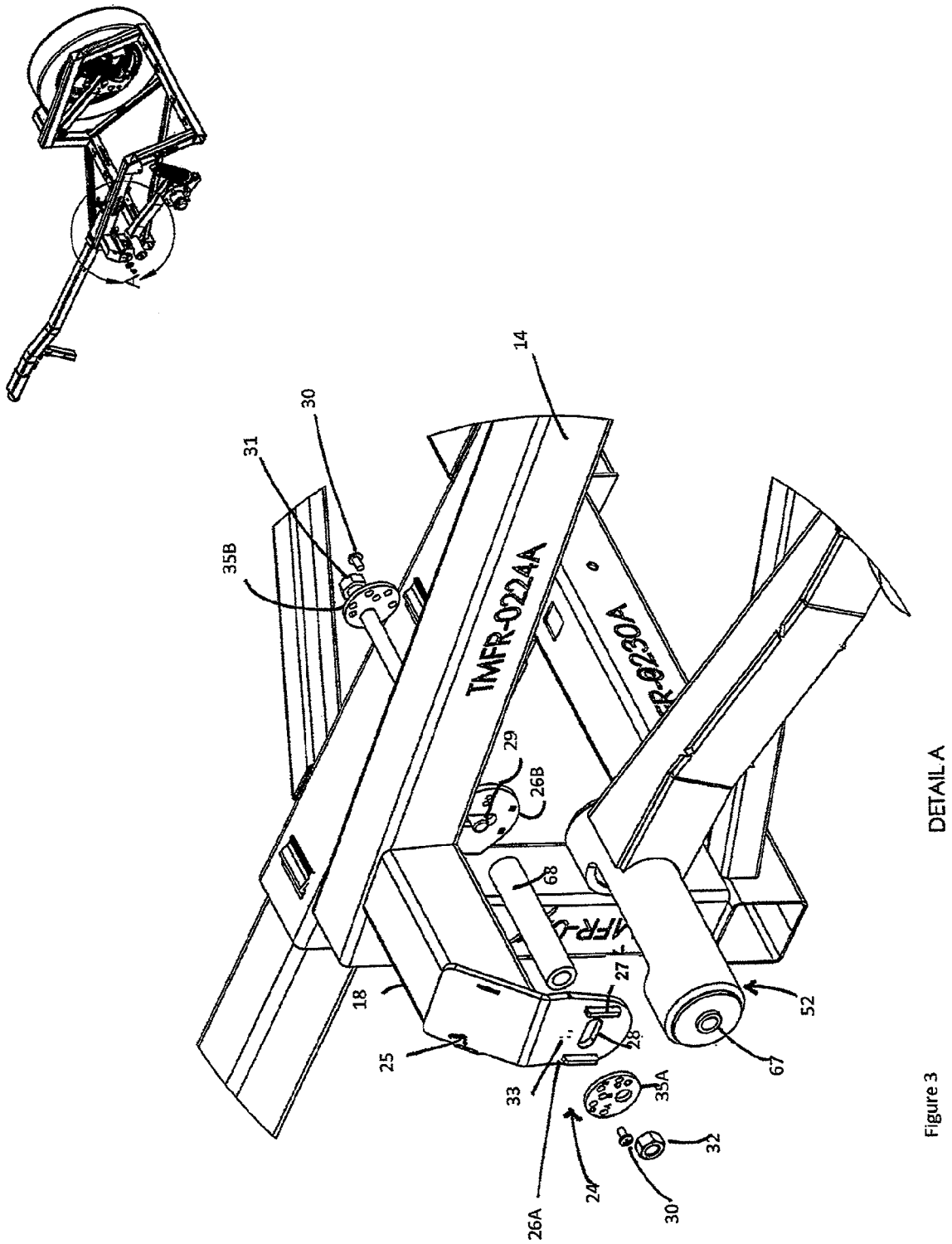
FIG. 3 is a perspective view of one embodiment of a toe/camber adjustment mechanism.

In the embodiment shown in FIG. 3, pivot joint 52 is connected to the trailer frame 1 in conjunction with a toe/camber adjustment mechanism 24. This embodiment of the toe/camber adjustment mechanism 24 will include a suspension link bracket 25 having a pair of downwardly extending ear sections 26A and 26B. In the particular example of FIG. 3, ear section 26A is connected to frame extension 18 while ear section 26B is directly positioned on longitudinal frame member 14. It can be seen that ear section 26A includes a substantially horizontal slot 28, cam stops 27 on either side of side of slot 28, and locking screw apertures 33. Ear section 26B is substantially identical to ear section 26A, except all the features are shifted 90 degrees, e.g., the slot is vertical slot 29 and the cam stops 27 (hidden from view on ear section 26B) are oriented in the vertical direction. As used herein, "horizontal" denotes an item being generally parallel to the ground surface on which the trailer rests, while "vertical" denotes being generally perpendicular to such ground surface.

Figure 4:
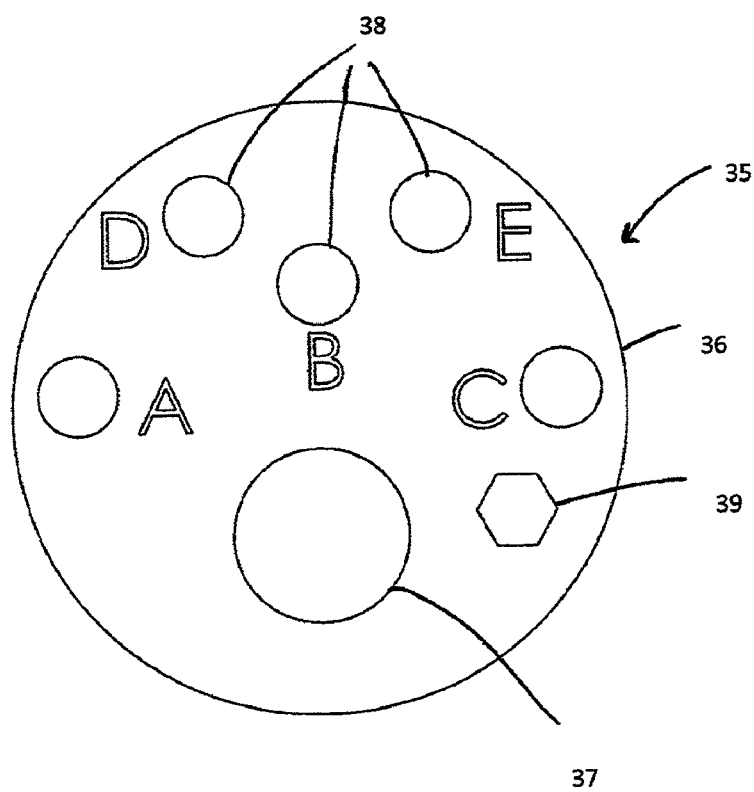
FIG. 4 is top view of one embodiment of a cam plate used in the toe/camber adjustment mechanism.

Another element of this toe/camber adjustment mechanism 24 are cam plates 35, one example of which is best seen in FIG. 4. This embodiment of cam plate 35 comprises a circular body 36 having rod aperture 37, a series of positioning apertures 38, and a torque application point 39. In FIG. 4, the torque application point 39 is a hexagonal aperture sized to receive a conventional allen-type wrench or key. However, torque application point 29 could be any non-circular aperture or indentation, or even a polygonal post (e.g., a bold head) extending from the surface of cam body 36. As one non limiting example, the cam body 36 is a steel coin-shaped plate approximately 1.4 inches in diameter and about 0.12 inches in thickness. It will be understood that rod aperture 37 is off-set from the center of cam body 36 in order to impart its cam function.

Viewing again FIG. 3, it can be envisioned how the rod 31 (in this example a conventional bolt) will extend through rod aperture 37 in cam plate 35B, through vertical slot 29 in ear section 26B, through spacer 68 and inner bushings 67, through horizontal slot 28 in ear section 26A, and finally through rod aperture 37 in cam plate 35A before being secured in place by nut 32. Viewing this assembled structure in the detail insert of FIG. 1 in conjunction with FIG. 3, the operation of the toe/camber adjustment mechanism may be visualized. With the locking screw 30 removed, cam plate 35A is free to rotate on pivot rod 31 (within the bounds of cam stops 27) when torque is applied to the cam plate via torque application point 39 (or in some other manner). Rotation of cam plate 35A counter-clockwise (e.g., from the 12 o'clock position to the 9 o'clock position) will displace that end of pivot rod to the right in horizontal slot 28. On the other hand, rotation of cam plate 35A clockwise (e.g., from the 12 o'clock position to the 3 o'clock position) will displace that end of pivot rod to the left in horizontal slot 28. It will be understood that this left/right movement of pivot rod 31 in horizontal slot 28 causes a slight rotation of pivot joint 52 in a plane parallel with the ground surface and will therefore adjust the "toe" of a tire mounted on wheel hub assembly 53. The desired rotative position of cam plate 35A is locked in place by passing locking screw 30 through the desired positioning aperture 38 and engaging the screw with one of the locking screw apertures 33. The same function takes place with the rotation of cam plate 35B, except now pivot rod 31 moves up and down in vertical slot 29. This vertical movement of pivot rod 31 causes a slight rotation of pivot joint 52 (in a plane perpendicular to the ground surface) which imparts the desired camber to the tire.

Certain embodiments of trailer frame 1 will include a tongue adjustment mechanism best understood by viewing FIGS. 1 and 5. FIG. 1 illustrates a tongue receiver slot 20, which in one preferred embodiment is tongue receiver tube 21 which is welded to front angled members 11 and front lateral member 12. While the term "receiver slot" encompasses tubular members, the receiver slot 20 could also be a non-tubular structure which can sliding engage the trailer tongue and allow the position of the trailer tongue to be adjusted relative to the receiver slot. In the illustrated embodiments, receiver tube 21 is a rectangular tubular member, but could take on other various tubular cross-sections in alternate embodiments.

As best seen in FIG. 5B, receiver tube 21 includes an open front section 82 and an open rear section 83. It will be understood that in the illustrated embodiment, tongue receiver tube 21 has an internal dimension which is larger than the external dimension of tongue member 2. This allows tongue member 2 to slide through receiver tube 21 and allows at least a portion of a tongue member to slide past open rear section 83 toward the rear of trailer frame 1. As is known in the art, both tongue member 2 and receiver tube 21 will have side apertures 72 which allow the relative positions of these elements to be fixed when a pin is inserted through the aligned side apertures 72. It will be understood that because this embodiment of trailer frame 1 fixes receiver tube 21 above front lateral member 12 and leaves open rear section 83 unobstructed by other frame members, tongue member 2 can slide rearward virtually until it encounters rear lateral member 17. This allows the overall length of the trailer to be significantly reduced for advantageous storage purposes.

Figure 6A:
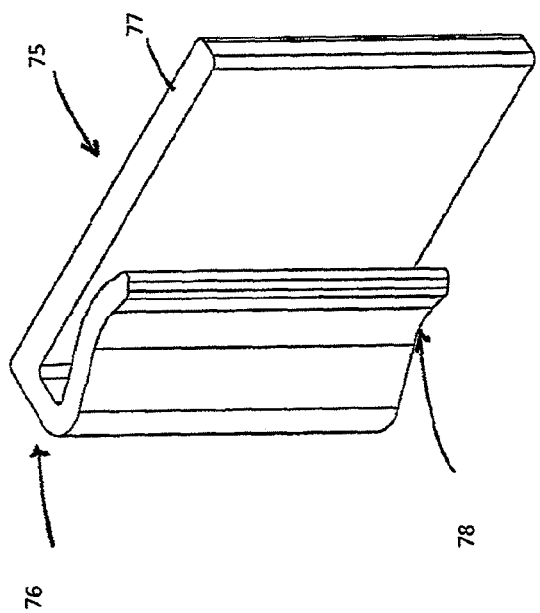
FIGS. 6A to 6C are different views of one embodiment of a low friction insert material.
Figure 6C:
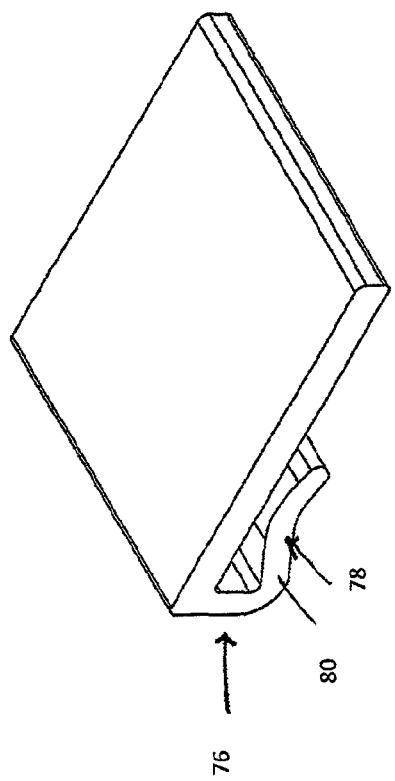
Figure 6B:
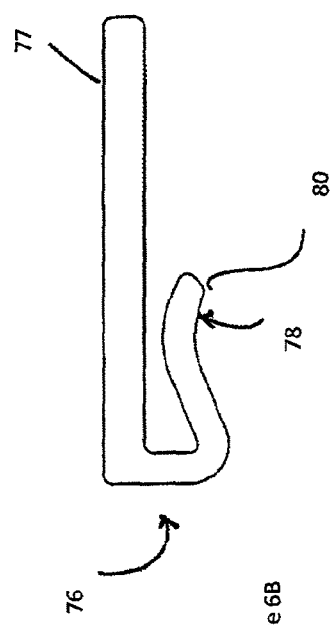

Viewing FIG. 5B, another embodiment of trailer frame 1 includes a low friction section of material 75 which is positioned on at least two opposing surfaces between the tongue receiver tube 21 and tongue member 2. In the example of FIG. 5B, the section of material 75 is positioned on the top and bottom internal surface of receiver tube 21 and (although hidden from view) is also positioned on the inside lateral surfaces of receiver tube 21. As shown in the detailed section of FIG. 5B and best seen in FIGS. 6A to 6C, the illustrated embodiment of section of material 75 forms a clip-shaped member 76 which has an internal portion 77 positioned in receiver tube 21 and an external portion 80 which forms a folded or clip section 78, extending through opening 79 in the wall of receiver tube 21, and holding the low friction material in place within receiver tube 21. In FIG. 5B, the receiver tube 21 has four clip shaped sections 76, but other embodiments could have fewer or more sections 76. In preferred embodiments, the clip shaped sections 76 are formed of ultra high molecular weight polyethylene (UHMW), but may be formed of any low friction material, including non-limiting examples such as Teflon coated materials, HDPE, or PTFE.

The various embodiments shown in the drawings herein illustrate that the present invention may be implemented and embodied in a variety of different ways that still fall within the scope of the present invention. A series of nonlimiting example embodiments are as follows.

Embodiment A includes a trailer comprising a forward frame section; a rearward frame section; a trailing arm suspension link comprising: (a) a pivot joint connected to the forward frame section; (b) a wheel hub assembly; and (c) a shock mount; and a shock absorbing mechanism having a first end pivotally connected to said shock mount and a second end pivotally connected to said rear frame section, wherein an angle theta formed between a first axis extending through said trailing arm suspension link and a second axis extending through said shock absorbing mechanism is between about 60° and about 120°.

Variations on Embodiment A include: (i) wherein said angle theta is about 90°; (ii) wherein said shock absorbing mechanism is mounted in a preponderantly vertical orientation; (iii) further comprising two trailing arm suspension links forming an independent suspension system without a unitary cross axle; (iv) wherein said trailing arm suspension link further comprises a spindle to support said wheel hub and said shock mount comprises an L-shaped double bracket positioned beneath said spindle; (v) wherein said L-shaped double bracket has two pin apertures to form a pivotal connection with said shock absorbing mechanism; (vi) wherein said shock absorbing mechanism is at least one of a coil over shock device, a metal spring shock device, a piston shock device, or an air spring shock device; (vii) wherein no frame member is positioned directly below said trailing arm suspension link; (viii) wherein said pivot joint of said trailing arm suspension link further comprises two NVH bushings, each including a flexible polymer cylinder with a metal sleeve extending therethrough; (ix) wherein the trailer further comprises a tongue receiver slot including an open front section and an open rear section allowing at least a portion of a tongue member to slide past said open rear section; (x) wherein said tongue receiver slot is a first tubular member having an internal dimension and said tongue member is a second tubular member having an external dimension less than said internal dimension; (xi) wherein a low friction section of material is positioned on at least two opposing surfaces between said tongue receiver slot and said tongue member; (xii) wherein said tongue receiver slot includes at least two surface apertures and said section of low friction material is a polymer material having a clip shape, with a portion of said clip internal to said tongue receiver slot and a portion of said clip external to said tongue receiver slot; (xiii) wherein the trailer further comprises a tubular tongue receiver having an internal dimension and a tubular tongue member having an external dimension less than said internal dimension; (xiv) wherein a low friction section of material is positioned on at least two opposing surfaces between said tongue receiver and said tongue member; (xv) wherein said tongue receiver slot is positioned on said front frame section and said tongue member is sufficiently long to slide past said open rear section and a rear end of said tongue member to reach said rearward frame section; (xvi) wherein said pivot joint further comprises a camber adjustment mechanism; (xvii) wherein said pivot joint further comprises a toe adjustment mechanism; (xviii) wherein said pivot joint further comprises a toe adjustment mechanism; (xix) wherein said camber adjustment mechanism comprises an ear section with a vertical slot and said toe adjustment mechanism comprises an ear section with a horizontal slot; (xx) wherein cam plates are positioned adjacent to said ear sections; (xxi) wherein a retaining rod securing said pivot joint to said forward frame section passes through rod apertures in said cam plates; (xxii) wherein said cam plates are circular and said rod apertures are offset from a center of said plates; (xxiii) wherein a plurality of positioning apertures are formed on each of said cam plates; (xxiv) wherein said cam plates comprise a torque application point; (xxv) wherein said torque application point is a non-circular aperture; (xxvi) wherein the trailer further comprises a toe/camber adjustment mechanism comprising: (a) a suspension link bracket on said forward frame section, said bracket including first and second ear sections with said pivot joint positioned between said ear sections; (b) said first ear section having a substantially horizontal slot with cam stops on each end of said horizontal slot; (c) said second ear section having a substantially vertical slot with cam stops on each end of said vertical slot; and (d) circular cam plates positioned between said cam stops on each of said first and second ear sections, said cam plates comprising a rod aperture offset from a center of said cam plates; (xxvii) wherein said cam plates comprise a plurality of positioning apertures and at least one locking insert member aligns and fixes a positioning aperture in said cam plates with an aperture in said ear sections; (xxviii) wherein said cam plates comprise a torque application point; (xxix) wherein said torque application point is a non-circular aperture; and (xxx) wherein said locking insert member is a screw.

Embodiment B includes a toe/camber adjustment mechanism comprising a suspension link bracket including first and second ear sections; said first ear section having a substantially horizontal slot with cam stops on each end of said horizontal slot; said second ear section having a substantially vertical slot with cam stops on each end of said vertical slot; and generally rounded cam plates positioned between said cam stops on each of said first and second ear sections, said cam plates comprising: a rod aperture offset from a center of said cam plates, a plurality of positioning apertures, a torque application point, at least one locking insert member aligning and fixing said positioning apertures in said cam plates with apertures in said ear sections; and a pivot rod extending through said slots in said ear sections and rod apertures in said cam plates.

Variations on Embodiment B include: (i) wherein said torque application point is a non-circular aperture; and (ii) wherein said locking insert member is a screw.

Embodiment C includes a trailer comprising a forward frame section; a rearward frame section; a suspension system including a wheel hub assembly; and a tongue receiver slot position on said forward frame section, the tongue receiver slot including an open front section and an open rear section allowing at least a portion of a tongue member to slide past said open rear section.

Variations on Embodiment C include: (i) wherein said tongue receiver slot is a first tubular member having an internal dimension and said tongue member is a second tubular member having an external dimension less than said internal dimension; (ii) wherein a low friction section of material is positioned on at least two opposing surfaces between said tongue receiver slot and said tongue member; (iii) wherein said tongue receiver slot includes at least two surface apertures and said section of low friction material is a polymer material having a clip shape, with a portion of said clip internal to said tongue receiver slot and a portion of said clip external to said tongue receiver slot; (iv) wherein a low friction section of material is positioned on at least two opposing surfaces between said tongue receiver and said tongue member; (v) wherein said tongue receiver slot is positioned on said front frame section and said tongue member is sufficiently long to slide past said open rear section and a rear end of said tongue member to reach said rearward frame section.

Although the above described has been made in terms of certain specific embodiments, those skilled in the art will recognize many other obvious modification and variations. All such modifications and variations are intended to come within the scope of the following claims.

The invention claimed is:
1. A trailer comprising:
a) a forward frame section;
b) a rearward frame section;

c) two trailing arm suspension links forming an independent suspension system without a unitary cross axle, the trailing arm suspension links comprising;
   i) a pivot joint connected to the forward frame section;
   ii) a wheel hub assembly including a spindle;
   iii) a shock mount including a bracket positioned rearward of the spindle; and
d) a shock absorbing mechanism having a first end pivotally connected to the shock mount and a second end pivotally connected to the rear frame section rearward of the shock mount.

2. The trailer according to claim 1, wherein an angle theta formed between a first axis extending through said trailing arm suspension links and a second axis extending through said shock absorbing mechanisms is between about 60° and about 120°.

3. The trailer according to claim 1 wherein the shock absorbing mechanism is mounted in a preponderantly vertical orientation.

4. The trailer according to claim 1, wherein the shock mount comprises an L-shaped double bracket positioned beneath the spindle.

5. The trailer according to claim 1, wherein the shock absorbing mechanism is at least one of a coil over shock device, a metal spring shock device, a piston shock device, or an air spring shock device.

6. The trailer according to claim 1, wherein no frame member is positioned directly below the trailing arm suspension link.

7. The trailer according to claim 1, wherein said pivot joint of said trailing arm suspension link further comprises two NVH bushings, each including a flexible polymer cylinder with a metal sleeve extending therethrough.

8. The trailer according to claim 1, further comprising a tongue receiver slot including an open front section and an open rear section allowing at least a portion of a tongue member to slide past said open rear section.

9. The trailer according to claim 8, wherein said tongue receiver slot is a first tubular member having an internal dimension and said tongue member is a second tubular member having an external dimension less than said internal dimension.

10. The trailer according to claim 8, wherein a low friction section of material is positioned on at least two opposing surfaces between said tongue receiver slot and said tongue member.

11. The trailer according to claim 10, wherein said tongue receiver slot includes at least two surface apertures and said section of low friction material is a polymer material having a clip shape, with a portion of said clip internal to said tongue receiver slot and a portion of said clip external to said tongue receiver slot.

12. The trailer according to claim 1, further comprising a tubular tongue receiver having an internal dimension and a tubular tongue member having an external dimension less than said internal dimension.

13. The trailer according to claim 12, wherein a low friction section of material is positioned on at least two opposing surfaces between said tongue receiver and said tongue member.

14. The trailer according to claim 1, wherein said pivot joint further comprises a camber adjustment mechanism.

15. The trailer according to claim 14, wherein said pivot joint further comprises a toe adjustment mechanism.

16. The trailer according to claim 1, further comprising a toe/camber adjustment mechanism comprising:
   a. a suspension link bracket on said forward frame section, said bracket including first and second ear sections with said pivot joint positioned between said ear sections;
   b. said first ear section having a substantially horizontal slot with cam stops on each end of said horizontal slot;
   c. said second ear section having a substantially vertical slot with cam stops on each end of said vertical slot; and
   d. circular cam plates positioned between said cam stops on each of said first and second ear sections, said cam plates comprising a rod aperture offset from a center of said cam plates.

17. The trailer according to claim 16, wherein said cam plates comprise a plurality of positioning apertures and at least one locking insert member aligns and fixes a positioning aperture in said cam plates with an aperture in said ear sections.

18. The trailer according to claim 17, wherein said cam plates comprise a torque application point.

19. The trailer according to claim 18, wherein said torque application point is a non-circular aperture.

20. The trailer according to claim 17, wherein said cam plates include a locking insert member.

21. A trailer comprising:
   a. a forward frame section;
   b. a rearward frame section;
   c. a trailing arm suspension link comprising:
      (i) a pivot joint connected to the forward frame section;
      (ii) a wheel hub assembly;
      (iii) a shock mount; and
   d. a shock absorbing mechanism having a first end pivotally connected to said shock mount and a second end pivotally connected to said rear frame section,
   e. wherein an angle theta formed between a first axis extending through said trailing arm suspension link and a second axis extending through said shock absorbing mechanism is between about 60° and about 120°.

22. A trailer comprising:
   a. a forward frame section;
   b. a rearward frame section;
   c. a suspension system including a wheel hub assembly; and
   d. a tongue receiver slot position on said forward frame section, the tongue receiver slot including an open front section and an open rear section allowing at least a portion of a tongue member to slide past said open rear section.

* * * * *